April 28, 1964     D. L. BULMER     3,130,874
MEASURING DISPENSER
Filed Nov. 3, 1960     2 Sheets-Sheet 1
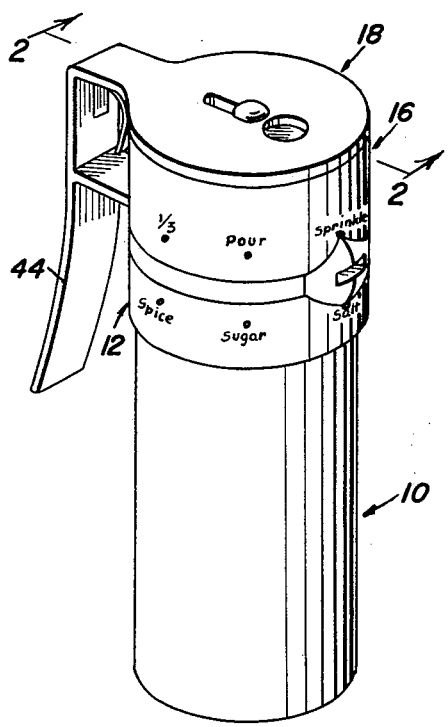
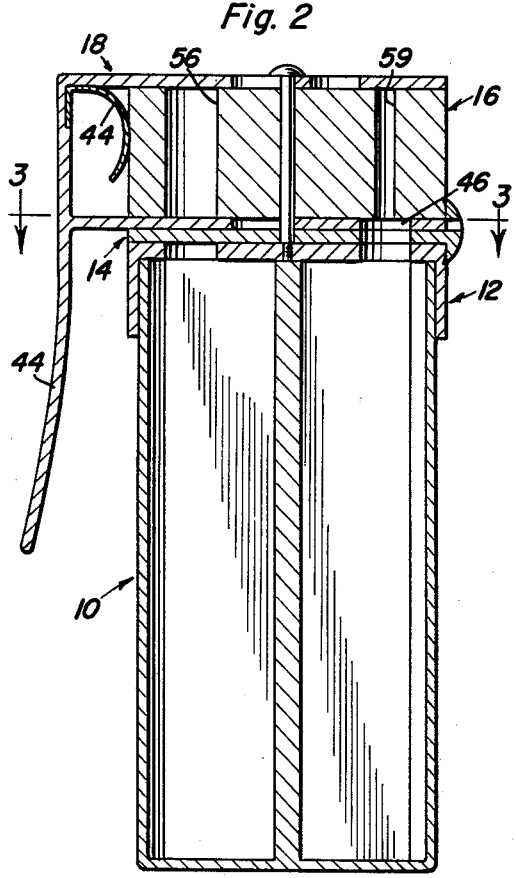
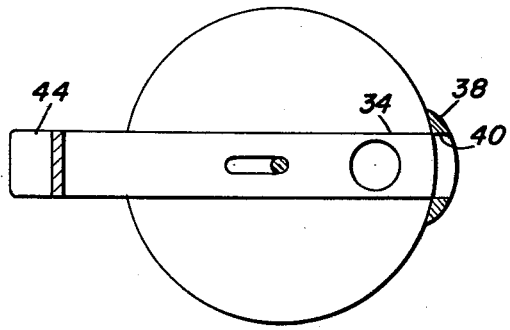
Donald L. Bulmer
INVENTOR.

April 28, 1964     D. L. BULMER     3,130,874
MEASURING DISPENSER
Filed Nov. 3, 1960     2 Sheets-Sheet 2
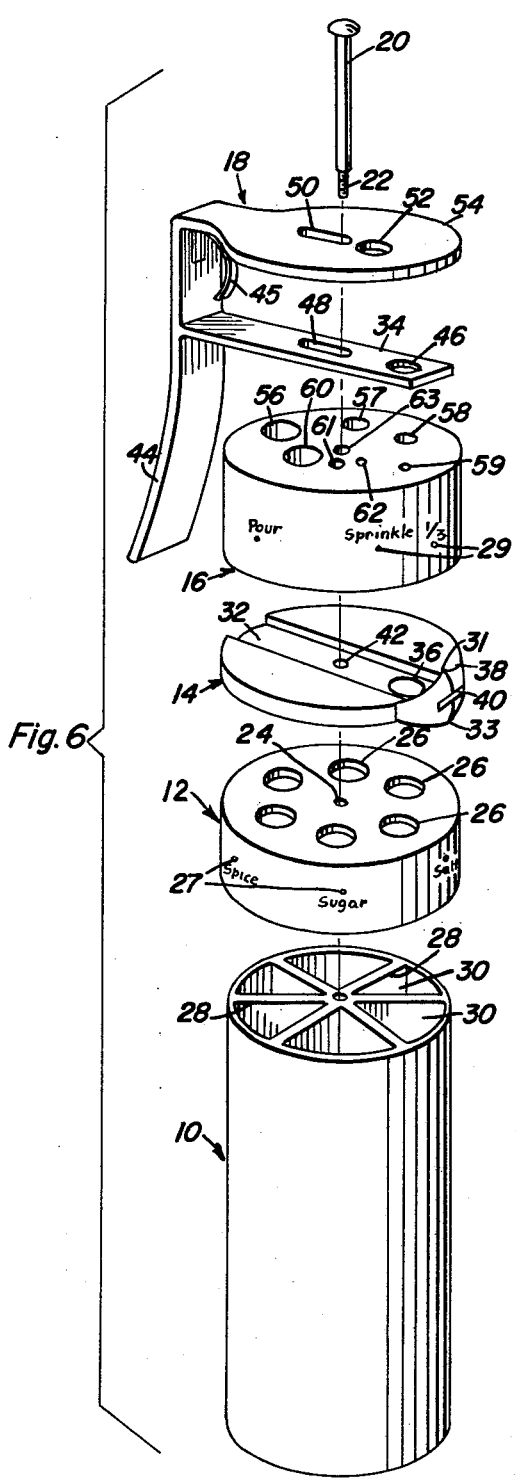
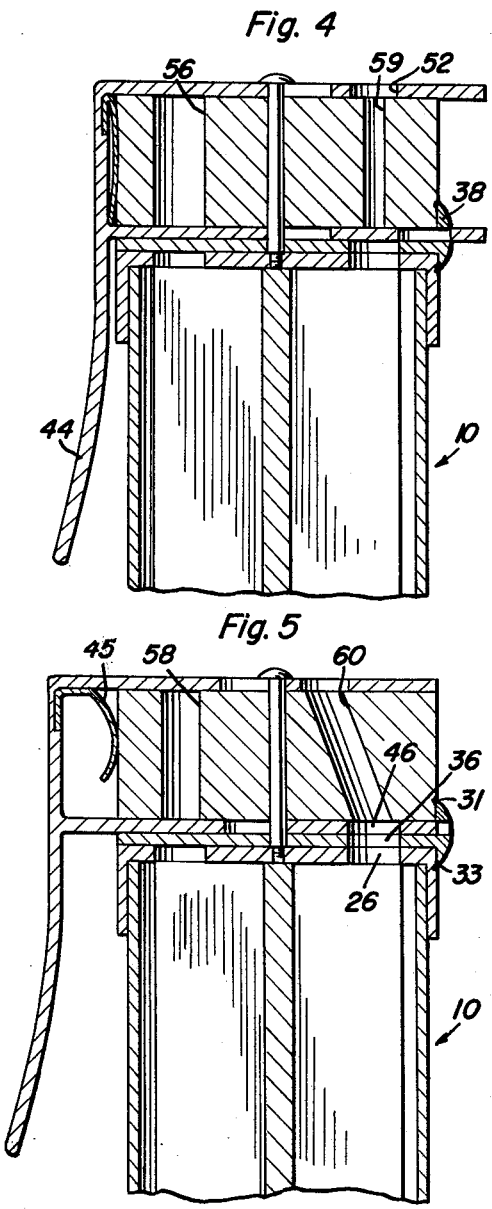
Donald L. Bulmer
INVENTOR.

United States Patent Office 3,130,874
Patented Apr. 28, 1964

3,130,874
MEASURING DISPENSER
Donald L. Bulmer, Chicago, Ill.
(9001 Washington St., Westminster, Calif.)
Filed Nov. 3, 1960, Ser. No. 67,007
9 Claims. (Cl. 222—142.8)

This invention relates to a dispenser, and more particularly to a device for storing, dispensing and measuring powdered and granulated materials, especially such as used in the preparation of foods.

It is an object of this invention to provide a dispensing attachment for use with a container of foodstuffs of powdered or granulated materials in which a predetermined quantity may be measured out and dispensed.

It is a further object of this invention to provide a dispensing attachment for use with a container of granulated materials which retains a predetermined quantity thereof in place for later use.

Still another object of the invention is to provide a dispensing attachment for use with a container for powdered or granulated materials or foodstuffs which is adapted to replace the normal cap for the container.

Still yet another object of the invention is to provide a dispensing device for containers which is inexpensive to manufacture, easy to produce and simple to attach to the container.

Another object of the invention is to provide a container having a plurality of compartments wherein each compartment may contain a different type of granulated or powdered foodstuffs and means are provided on the container for selectively opening any one of the compartments for dispensing any one of the desired foodstuffs.

Yet another object of the invention is to provide a container having a plurality of foodstuffs therein and a dispensing means is provided on the container for selectively dispensing any one of the selected foodstuffs or alternatively for selectively measuring a predetermined quantity of any one of the selected foodstuffs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 shows the completed and assembled dispensing and measuring device in perspective;

FIGURE 2 shows an enlarged vertical cross-section taken substantially on the plane of line 2—2 of FIGURE 1;

FIGURE 3 is a cross-sectional view taken substantially on the plane of line 3—3 in FIGURE 2;

FIGURE 4 is a view similar to FIGURE 2 and showing the upper portion of the dispensing device when it is being used for measuring purposes;

FIGURE 5 is a view similar to FIGURE 4 and showing the dispensing device when it is in the open position;

FIGURE 6 is an exploded view of the complete dispensing and measuring device.

Referring to FIGURES 2 and 6, it can be seen that the dispenser is composed of several sub-assemblies. The container 10 has snugly fitted to its top portion a lid 12. The lid 12 may be inserted on or separated from the separator 10 by manual means. However, if desired the lid may be threaded to the upper end of a container 10 in a conventional manner. Movably mounted upon the upper surface of the lid is a type selector 14, a selector cylinder 16 and a valve assembly 18.

A stud 20 has its lower end reduced in diameter and threaded. The stud extends through apertures in the valve assembly, selector cylinder and type selector and is screwed tightly into a threaded aperture 24 in the lid. The lid 12 fits relatively tight upon the upper portion of the container 10 and therefore it does not move relative to the container 10 during normal operation of a dispenser. The container 10 is divided into a plurality of compartments 30 by vertically extending partitions 28. The cap 12 has a plurality of holes 26 of identical size and equal in number to the number of compartments 30. When the cap is inserted on the container, each hole 26 is substantially aligned with the center of each compartment 30.

Extending transversely across the selector is a transverse groove 32 which receives and is completely filled by the valve member 34. When the handle member 44 is rotated about the pin 20, the valve member 34 being fixed to the handle 44 and fitting in the recess 32 thereby rotates the selector 14. By thus rotating the selector, the selector aperture 36 may thereby be aligned with any one of the holes 26 and any one of the compartments 30 for selecting any one of the various materials in each of the compartments.

As shown in FIGURE 5, the leaf spring 45 normally maintains the selector recess 36 in alignment with one of the apertures 26. As shown in FIGURE 5, the leaf spring 45 normally maintains the valve aperture 46 in alignment with the selector aperture 36 and lid aperture 26.

The lower valve member 34 and the upper valve member 54 have elongated apertures 48 and 50 respectively extending through the central portions of these members. The pin 20 extends through these elongated apertures 48 and 50 and thereby the valve members may reciprocate horizontally on the pin 20 within the limit defined by the elongated apertures.

The selector cylinder 16 is rotatably mounted on the pin 20 and between the valve members 34 and 54. The selector cylinder 16 is rotatable about a central aperture 63 and has extending vertically through one edge four measuring apertures 56, 57, 58 and 59. Extending diagonally through the other side of the selector cylinder are three dispensing bores 60, 61 and 62.

The type selector 14 has a shield-type plate 38 centered over one end of the slot 32 and having a rectangular aperture therethrough aligned with the slot 32. This shield serves as an additional support for the valve member 34 and also adds an ornamental appearance to the dispenser. The plate 38 is resilient and has points 31 and 33 projecting slightly inwardly toward pin 20. When selecting a specific compartment 30, type selector 14 is rotated by handle 44 until point 33 snaps into the appropriate recess 27 on cap 12. Detent 27, 33 holds type selector 14 in position on the cap. Selector cylinder 16 is likewise held in any selected position by having points 31 pressing into a recess 29.

In operation, each compartment 30 of the container 10 is normally filled with some different type of graulated or powered foodstuff, such as spices. Each compartment may be labeled as to its contents as illustrated on the cap or lid 12, as shown in the drawings. When it is desired to use the device purely as a dispensing means, then one of the dispensing apertures 60, 61 or 62 will be aligned with the valve apertures 52 and 46 as illustrated in FIGURE 5 by rotating the selector cylinder 16 relative to the handle 44. If a rapid flow of material is desired, then the large aperture 60 will be aligned with the valve apertures. If a medium or small flow is desired, then one of the apertures 61 or 62 will be aligned with the valved apertures. After the appropriate dispensing aperture has been selected, then the handle 44 will be rotated relative to the container 10 for aligning the valve aperture 46 and selector aperture 36 with the appropriate lid aperture 26. Then by tilting the entire assembly by means of the handle 44, the desired or selected foodstuff may be poured from the container 10.

The four bores 56, 57, 58 and 59 in the selector or measuring cylinder 16 are each of a specific size so as to measure a specific quantity of powdered or granulated material. The exact size of the bores will depend upon specific use of the dispenser and the type of materials measured. As an example, the bore 59 could hold one-third of a tablespoon, the bore 58 could hold two-thirds of a tablespoon, the bore 57 could hold one tablespoon and the bore 56 could hold two tablespoons. If for example it is desired to measure one-third of a tablespoonful of sugar, then the handle 44 would be rotated so as to align the apertures 46 and 36 with the specific aperture 26 which lies over the sugar compartment. Then while the handle 44 is held in one hand, the other hand of the operator would be used to rotate the measuring cylinder 16 so as to align the aperture 59 with the aperture 46 as shown in FIGURE 2. The indicating marks and fraction labels on the outer surface of the measuring cylinder may be aligned with the central line of the shield 38 to facilitate the alignment of the various apertures during operation and use of the device. After the vertical measuring aperture 59 is aligned with the valve aperture 46, and the aperture 46 has been aligned with the compartment containing sugar, then the entire container is turned upside down so as to fill the bore 59 completely with sugar. Then the handle 44 is urged toward the container 10 so as to move the bore 52 over the bore 59 and thereby empty the measured amount of sugar.

If it is desired to use the device for dispensing one substance, then the partitions 28 may be omitted and the lid 12 and selector 14 could be made as one part having only one aperture in the same location as hole 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dispenser comprising a container having at least one aperture therein, a valve member movable relative to said aperture for covering and uncovering same, a movable measuring member having a plurality of apertures therethrough each smaller in volume than said container and of different predetermined sizes movable whereby one end of any one of said plurality of apertures may be aligned with said container aperture, a second valve member movably mounted relative to said measuring member for selectively closing and opening the other end of said aligned aperture.

2. A dispenser comprising a container having an opening therein, a lid having at least one aperture therein covering said opening, a valve member movable relative to said aperture for covering and uncovering same, a movable measuring member having a plurality of apertures therethrough each smaller in volume than said container and of different predetermined sizes movable whereby one end of any one of said plurality of apertures may be aligned with said lid aperture, a second valve member movably mounted relative to said measuring member for selectively closing and opening the other end of said aligned aperture, means connecting the valve members whereby when either valve member is covering one end of the aligned aperture in the measuring member, the other end thereof is open.

3. A dispenser comprising a container having an opening therein, a lid having at least one aperture therein covering said opening, a valve member movable relative to said aperture for covering and uncovering same, a movable measuring member having a plurality of apertures therethrough each smaller in volume than said container and of different predetermined sizes movable whereby one end of any one of said plurality of apertures may be aligned with said lid aperture, a second valve member movably mounted relative to said measuring member for selectively closing and opening the other end of said aligned aperture, means connecting the valve members whereby when either valve member is covering one end of the aligned aperture, the other end thereof is open, said measuring member further containing at least one dispensing aperture which is adapted to be moved into simultaneous alignment with an aperture in each of said valve members whereby the container opening is not covered.

4. A dispenser comprising a container having an opening therein, a lid having at least one aperture therein covering said opening, a valve member movable relative to said aperture for covering and uncovering same, a movable measuring member having a plurality of apertures therethrough each smaller in volume than said container and of different predetermined sizes movably mounted on the container whereby one end of any one of said plurality of apertures may be aligned with said lid aperture, a second valve member movably mounted relative to said measuring member for selectively closing and opening the other end of said aligned aperture, means connecting the valve members whereby when either valve member is covering one end of the aligned aperture in the measuring member, the other end thereof is open, said valve members provided with a handle and leaf spring for operating the valve members.

5. A dispensing device as recited in claim 3 wherein said container is divided into a plurality of compartments and said lid is provided with at least one aperture over each of said compartments.

6. A dispensing device as recited in claim 5 wherein said measuring member and valve member are rotatable about the axis of the container and said measuring member includes a plurality of different sized inclined dispensing aperatures adapted to be selectively aligned with the apertures in the valve members.

7. A dispenser comprising a container having a chamber therein, an opening in one wall of the container communicating with said chamber, a member rotatably mounted on the exterior of the container, a plurality of dispensing ducts of different sizes in said member, each of said ducts being selectively alignable, one at a time, with said opening as said member is rotated for dispensing material from the chamber at a desired rate, a valve member extending transversely across said member and over one end of one of said ducts, handle means for reciprocating said valve member across the one duct for selectively oepning and closing it.

8. A device as defined in claim 7 wherein said chamber is divided in a plurality of compartments, each compartment having one of said openings in a wall portion thereof, all the openings being concentrically arranged around the axis of rotation of said member, means rotatably mounting said valve member about the axis of rotation.

9. A dispenser comprising a container, at least one aperture therein, a first valve member including an aperture movable relative to said container for selectively aligning the container aperture and first valve member aperture, a measuring member having at least a pair of bores therethrough, each of said bores having one end thereof selectively communicated with the container aperture, and a second valve member including an aperture offset from the aperture in said first valve member and movable relative to said container aperture for selective alignment therewith, said second valve member aperture also being selectively alignable with the second ends of the bores, one of said bores being simultaneously alignable with both valve member apertures and the container aperture when said first valve member aperture is aligned with the container aperture, and the second bore being selectively alignable first solely with the first valve member aperture when this first valve member aperture is aligned with the container aperture and second solely with the second valve aperture.

References Cited in the file of this patent

UNITED STATES PATENTS

| | | |
|---|---|---|
| 582,972 | Austin | May 18, 1897 |
| 960,650 | Lind | June 7, 1910 |
| 2,002,039 | McPhee | May 21, 1935 |
| 2,018,389 | Wagner | Oct. 22, 1935 |
| 2,053,631 | Punte | Sept. 8, 1936 |
| 2,718,336 | Rochow | Sept. 20, 1955 |
| 2,890,816 | Horland | June 16, 1959 |
| 2,931,539 | Maxey | Apr. 5, 1960 |
| 2,944,707 | Steinmetz | July 12, 1960 |
| 3,005,578 | Mainieri | Oct. 24, 1961 |
| 3,007,612 | Tepper | Nov. 7, 1961 |
| 3,018,924 | Reed | Jan. 30, 1962 |